United States Patent [19]

Flynn

[11] Patent Number: 5,680,643
[45] Date of Patent: Oct. 21, 1997

[54] DATA BUS INCLUDING ADDRESS REQUEST LINE FOR ALLOWING REQUEST FOR A SUBSEQUENT ADDRESS WORD DURING A BURST MODE TRANSFER

[75] Inventor: David Walter Flynn, Cambridge, United Kingdom

[73] Assignee: Advanced RISC Machines Limited, Cambridge, United Kingdom

[21] Appl. No.: 591,588

[22] PCT Filed: Aug. 4, 1994

[86] PCT No.: PCT/GB94/01712

§ 371 Date: Feb. 9, 1996

§ 102(e) Date: Feb. 9, 1996

[87] PCT Pub. No.: WO95/06287

PCT Pub. Date: Mar. 2, 1995

[30] Foreign Application Priority Data

Aug. 20, 1993 [GB] United Kingdom ............. 9317361

[51] Int. Cl.[6] ............................................. G06F 13/28
[52] U.S. Cl. ....................... 395/855; 395/290; 395/855
[58] Field of Search ............................. 395/290, 855, 395/853

[56] References Cited

U.S. PATENT DOCUMENTS

| 4,851,990 | 7/1989 | Johnson et al. ............... 395/280 |
| 5,553,310 | 9/1996 | Taylor et al. .................. 395/860 |

FOREIGN PATENT DOCUMENTS

| 0 348 113 A2 | 12/1989 | European Pat. Off. ......... G06F 13/28 |
| 0 358 448 A2 | 3/1990 | European Pat. Off. ......... G06F 13/42 |
| 0 534 529 A1 | 3/1993 | European Pat. Off. ......... G06F 13/28 |

OTHER PUBLICATIONS

Zwie Amatai, David C. Wyland, "Burst Mode Memories Improve Cache Design", IRE Wescon Conference Record, North Hollywood, vol. 34 Nov. 1990.

Zwie Amitai, David C. Wyland, "Burst Mode Memories Improve Cache Design", IRE Wescon Conference Record, North Hollywood, California, vol. 34, Nov. 1990, pp. 29–32.

Primary Examiner—Jack B. Harvey
Assistant Examiner—Ario Etienne
Attorney, Agent, or Firm—Albert C. Smith, of Fenwick & West LLP

[57] ABSTRACT

Apparatus and method for data processing includes a common data bus (4) to interconnect a bus master circuit (6) with one or more bus slave circuits (8, 10, 12). The data processing apparatus (2) is configured to support burst mode transfers in which an address word is followed by a sequence of data words relating to addresses following on from that specified by the address word. Such transfers increase the number of data words transmitted per address word that need be specified. The data bus (4) includes an address request signal line (16) by which any of the bus slave circuits (8, 10, 12) may request an address word to be transmitted in the next processing cycle rather than a data word. In this way, the bus master circuit (6) need not be specifically adapted for the bus slaves that are attached to the bus (4), since the bus slaves can themselves indicate to what extent they are able to deal with burst mode transfers. A wait cycle request signal and a signal combination indicating that a burst mode transfer should be completely aborted are also supported.

9 Claims, 3 Drawing Sheets

DATA BUS INCLUDING ADDRESS REQUEST LINE FOR ALLOWING REQUEST FOR A SUBSEQUENT ADDRESS WORD DURING A BURST MODE TRANSFER

FIELD OF THE INVENTION

This invention relates to apparatus and method for data processing having a data bus. More particularly, this invention relates to such apparatus and method having a bus master circuit and a bus slave circuit.

BACKGROUND OF THE INVENTION

It is known to provide master and slave bus architectures in which a bus master is responsible for initiating and controlling data transfer on the data bus, with the one or more bus slaves serving to respond to transactions initiated by the bus master. Such architectures are readily expandable and allow diverse bus slaves to be managed by a single bus master. A disadvantage of such architectures is that the bus master must be able to accommodate differing performance parameters in the diverse bus slaves with which it communicates, e.g. the rate at which data can be transferred to or from a particular bus slave or the addressing requirements of each bus slave.

This is particularly the case in the context of high performance transfer modes via the data bus where not all of the bus slaves are likely to be able to deal with such high performance operation. This creates a problem in that, as a new bus slave is added to a system, the bus master may need to be reprogrammed/ reconfigured to take account of the performance characteristics of that new bus slave. This is a disadvantageous additional complexity in developing a new system where ideally one merely wishes to attach the various component parts to the data bus without having to alter the component parts for that particular combination.

European Patent Application EP-A-O 348 113 discloses a programmable memory controller that supports burst mode transfers and signals to a processor when a burst mode must terminate.

IBM Technical Disclosure Bulletin, vol. 33, no. 6B, November 1990, New York, U.S., page 422, "Computer system channel performance enhancement via address boundary release" discloses a memory controller that inserts wait states as required at page boundaries.

Wescon Conference Record, vol, 34, November 1990, North Hollywood, U.S., pages 29–32, Amitoi et al, "Burst mode memories improve cache design" discloses an integrated circuit including a bus master and a bus slave.

SUMMARY OF THE INVENTION

Viewed from one aspect, the invention provides apparatus and method for data processing including: a data bus for carrying data words and address words; and a bus master circuit for initiating a burst mode transfer via the data bus in which the bus master generates an address word, and the address word specifies a start address of a sequence of addresses, relating to respective ones of a plurality of data words to be transferred via the data bus in successive processing cycles; and a bus slave circuit for receiving the plurality of data words of the burst mode transfer from the bus master circuit via the data bus; wherein the data bus includes an address request signal line; and the bus slave circuit includes means for generating an address request signal when an address word is required by the bus slave circuit in a next processing cycle; and the bus master circuit includes means responsive to an address request signal received from the bus slave circuit via the address request signal line for interrupting the burst mode transfer and generating a further address word in said next processing cycle.

A burst mode transfer from a bus master circuit to a bus slave circuit is a particularly efficient and high performance mode of operation. Where the data being transferred will be associated with a predetermined sequence of addresses within the bus slave circuit, starting from an initial specified address, only the initial address need be specified. Thus, a single address word might be followed by hundreds or thousands of data words. The increase in the number of data words transferred per address word needing to be specified has the advantage of decreasing the time required to transfer a given block of data words.

Unfortunately, not all bus slaves are able to fully deal with such burst mode transfers. As one example, consider a page-mode dynamic random access memory (DRAM). Such DRAMs may be able to support burst mode transfers except when a page boundary is crossed. When a page boundary is crossed, the DRAM requires a new address word to be sent. In order to conventionally deal with this, the bus master must be aware of the page boundaries within the DRAM and not send burst mode transfers that span a page boundary.

The invention both recognizes and solves this and similar problems by providing an address request signal line within the data bus whereby a bus slave circuit can interrupt a burst mode transfer from a bus master circuit and request a further address word to be sent to it in the next processing cycle. In this way, the bus master circuit need not be specially adapted to each attached bus slave circuit and can simply proceed with a high performance burst mode transfer unless or until the bus slave circuit concerned indicates a need for a further address word. In this way, flexibility to modify the system is provided without having to compromise upon the provision of a high performance burst mode transfer.

A preferred feature of the invention having a strong synergy with the provision of the address request signal line is that in which said data bus includes a wait cycle request signal line;

said bus slave circuit includes means for generating a wait cycle request signal when a wait cycle is required by said bus slave circuit in said next processing cycle; and said bus master circuit includes means responsive to a wait cycle request signal received from said bus slave circuit via said wait cycle request signal line for inserting a wait cycle in said next processing cycle.

In this way, the speed with which a bus slave circuit is able to deal with data words received can be accommodated in that the bus slave circuit is able to make the bus master circuit insert wait cycles before proceeding with the transfer of the next data word. An example of such operation would be if the data bus transferred 32-bit words whereas a bus slave circuit was only able to deal with 8-bit words. In this case, upon receipt of a 32-bit word from the bus master circuit, the bus slave circuit would be likely to take at least four processing cycles to break down and store the received data word during which time the bus slave circuit could assert a wait cycle request signal to delay the transmission of further data words from the bus master circuit.

A particularly powerful preferred feature is that said bus master includes means responsive to simultaneous receipt of an address request signal and a wait cycle request signal for aborting and later retrying said burst mode transfer.

In this way, a bus slave circuit is able to force a complete retraction of a burst mode transfer initiated by the bus master circuit. This allows bus slave circuits such as bus bridges or repeaters to force the bus master circuit to relinquish the bus as if the transfer had not started in circumstances that might otherwise lead to a deadlock situation or malfunction given that the bus slave circuit is not available.

In order to facilitate the multiplexing of address words and data words on the single data bus, it is a preferred feature that said data bus includes an address or data specifying signal line;

said bus master circuit includes means for generating an address or data specifying signal specifying whether an address word or a data word will be generated by said bus master circuit during said next processing cycle as part of said burst mode transfer; and said bus slave circuit includes means responsive to an address or data specifying signal received from said bus master circuit via said address and data specifying signal line for controlling processing by said bus slave circuit during said next processing cycle.

It will be understood that the bus master circuit and the bus slave circuit may be distinct entities. However, there is an increasing trend towards integration by which such bus master circuits and bus slave circuits are combined together in an application specific integrated circuit (ASIC). The present invention is particularly suited for use in situations where said bus master circuit and said bus slave circuit are formed on a single integrated circuit since the amount of re-engineering of the various circuit parts needed to create the new ASIC is reduced.

It will be understood that the bus master circuit and the one or more bus slave circuits attached to the data bus can take many forms. However, the invention is particularly suited to situations in which the bus master circuit is a central processing unit core and one or more of the bus slave circuits comprise a page mode random access memory or a cache memory.

Viewed from another aspect, this invention provides a method of data processing, said method comprising the steps of:

initiating, in a bus master circuit, a burst mode transfer via a data bus in which said bus master generates an address word, said address word specifying a start address of a sequence of addresses, relating to respective ones of a plurality of data words to be transferred via said data bus in successive processing cycles; and receiving, in a bus slave circuit, said burst mode transfer from said bus master circuit via said data bus; wherein:

when an address word is required by said bus slave circuit in a next processing cycle, said bus slave circuit generates an address request signal on an address request signal line of said data bus; and in response to said address request signal received from said bus slave circuit via said address request signal line, said bus master circuit interrupts said burst mode transfer and generates a further address word in said next processing cycle.

DETAILED DESCRIPTION OF THE INVENTION

Figure 1:
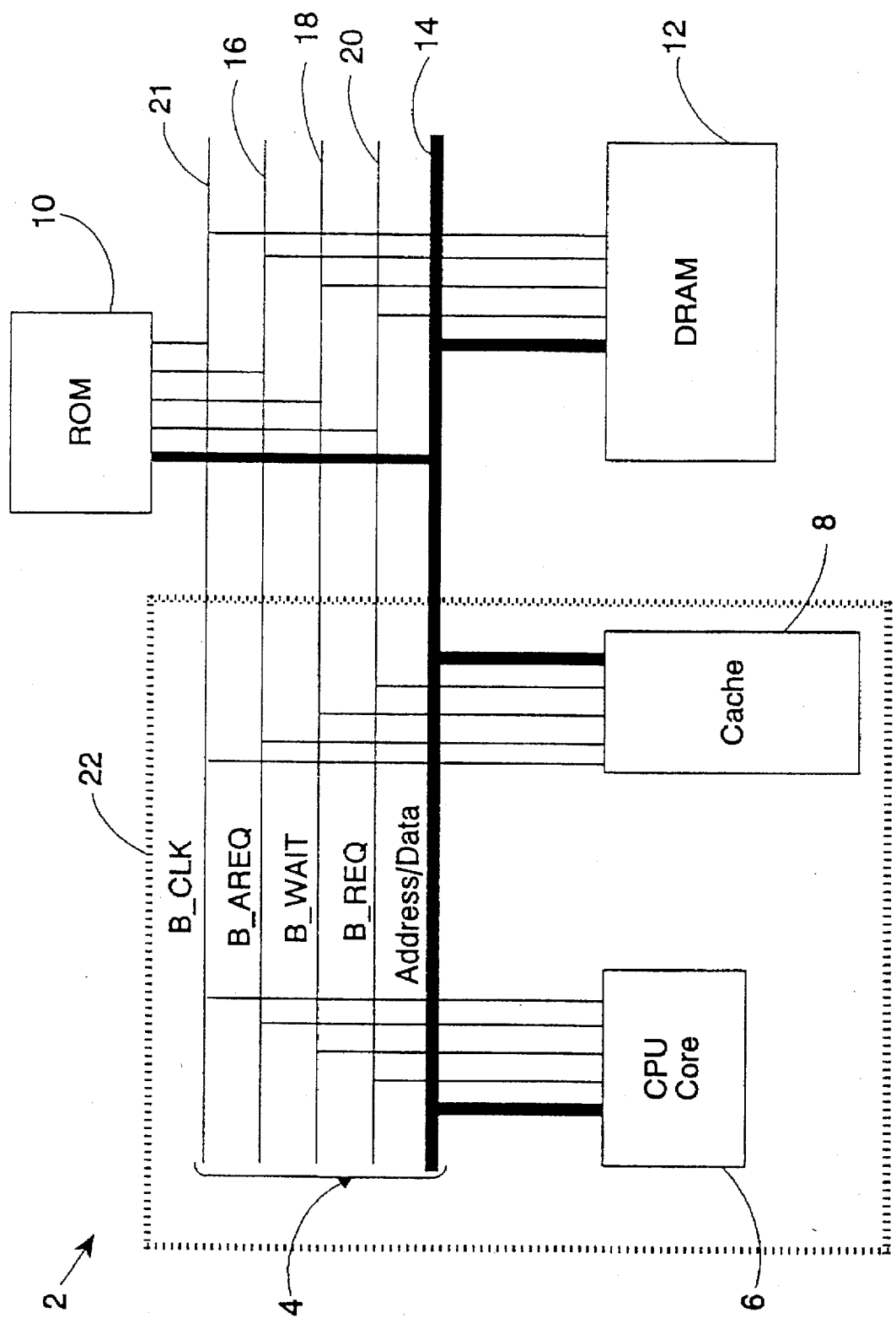
FIG. 1 schematically illustrates an apparatus for data processing having a data bus interconnecting a number of circuit elements.

FIG. 1 illustrates a data processing apparatus 2 comprising a number of circuit elements interconnected by a data bus 4. The circuit elements comprise a central processor unit (CPU) core 6, which functions as a bus master circuit, a cache memory 8, a read only memory (ROM) 10 and a page-mode dynamic random access memory (DRAM) 12, which function as bus slave circuits.

The data bus 4 contains 32-bit Address/Data signal lines, an address request signal line 16, a wait cycle request signal line 18, an address or data specifying signal line 20 and a bus clock signal line 21. It will be appreciated that the data bus will usually comprise a number of further signal lines concerned with control, timing and other functions. For the sake of simplicity, these have not been illustrated in FIG. 1.

The CPU core 6 acting as bus master circuit and the cache 8 acting as the first of the bus slave circuits are fabricated on a single integrated circuit 22. The further bus slave circuits comprising the ROM 10 and the DRAM 12 are external to the integrated circuit 22 and connected to the common data bus 4.

In operation, the CPU core 6 initiates a burst mode data transfer by placing a 0 value on the address or data specifying signal line as the signal B_REQ together specifying the bus slave circuit concerned and address within that bus slave circuit upon the Address/Data 32-bit signal lines 14. The device being addressed responds by asserting either a 0 or 1 on the wait cycle request signal line 18 as the B_WAIT Signal. If B_WAIT is 0, this indicates to the CPU core 6 that it should continue and transfer a data word in the next processing cycle. If B_WAIT is 1, then this indicates to the CPU core 6 that it should insert a wait state for the next cycle whilst the addressed but slave deals with the address word that has been sent to it and performs any necessary initialization.

When the bus slave circuit indicate that it is ready to proceed, the CPU core 6 passes a sequence of data words via the Address/Data signal lines 14 relating to a sequence of addresses within the bus slave circuit extending from the initial address specified. During this burst mode transfer, the bus slave circuit can assert a value of 1 upon the wait cycle request signal line 18 at any time and cause the CPU core 6 to pause in the burst mode transfer.

Depending upon the nature of the bus slave circuit concerned, it may be that it is not able to support burst mode transfers at all or not fully support burst mode transfers, in which case it can make use of the address request signal line 16 to set the B_AREQ signal to a value of 1 to force the CPU core 6 to broadcast an address word in the next processing cycle. If the value of the B_AREQ signal is 0, then this allows the CPU core to continue with the burst mode transaction.

In the case of the bus slave circuits illustrated, the cache 8 may be fully support burst mode transfers, the page mode DRAM 12 partially support burst mode transfers and the ROM not be able to support burst mode transfers at all. Thus, in the case of the ROM 10, an address word may be required for each data word read from the ROM. Furthermore, if the ROM were an 8-bit device, then it might take 4 processing cycles for the ROM 10 to respond to a request to read data from it and assemble a full 32-bit word to be placed upon the 32-bit Address/Data signal lines 14.

In the case of the ROM 10, data transfers are only ever read operations from the ROM 10. In the case of the DRAM 12 and the cache 8, the burst mode transfers can be either from the bus master CPU core 6 or to the bus master CPU core 6. This direction is controlled by a further bus signal B_WRITE (not illustrated in FIG. 1).

In the case of the page mode DRAM 12, the address request signal need only asserted when a page boundary is crossed. In the case of the cache 8, burst mode transfers may be fully supported irrespective of their length with address wraparound taking place as necessary.

Figure 2:
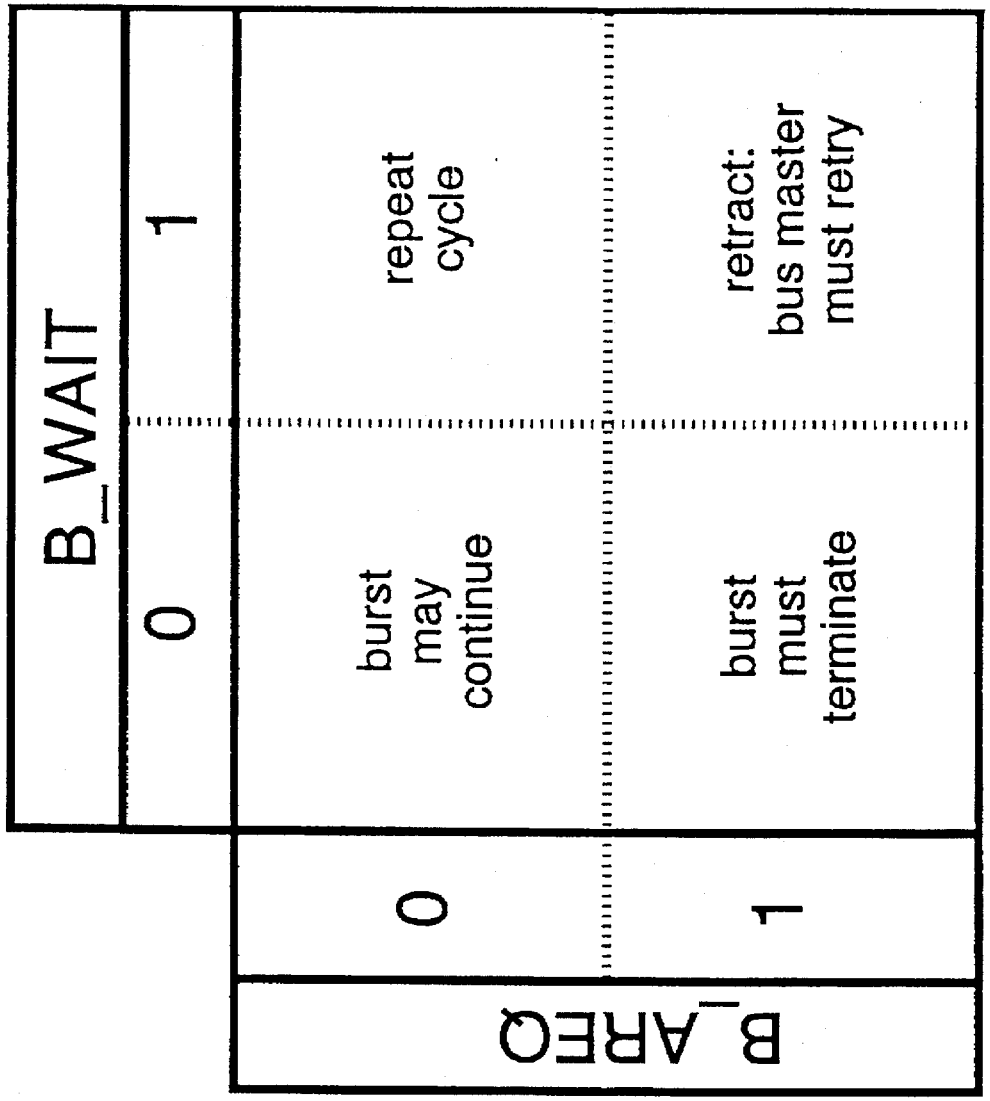
FIG. 2 illustrates the operation of the apparatus upon occurrence of differing combinations of signals on the data bus.

FIG. 2 shows a truth table of the various responses of the system to differing combinations of the B_AREQ signal and the B_WAIT signal. Using the notation [B_AREQ: B_WAIT], a signal [0:0] indicates that a burst transfer may continue, i.e. the bus slave is able to keep pace with the bus master and does not require any additional address words to be sent to it. The signal combination [0:1] indicates that the bus slave circuit is temporarily unable to keep pace with the bus master circuit and whilst the burst may continue without need of a further address word, the processor should repeat the current cycle to enable the bus slave circuit to catch up. The signal combination [1:0] indicates that the bus slave circuit requires a further address word to be sent to it before it can continue processing, i.e. the DRAM 12 is at a page boundary.

The final combination [1:1] is a specially assigned signal that is decoded by the bus master circuit to abort a burst mode transfer. In order that burst mode transfers should not be inappropriately aborted, it is important that the bus slave circuits are arranged such that the signal B_AREQ is asserted to a value of 1 only when the B_WAIT signal is at a value of 0, unless it is genuinely desired that the burst mode transfer be aborted. Situations in which the burst mode transfer is to be aborted may be those involving a bus bridge or repeater which is already involved in some other operation and is unable to respond to the current burst mode transfer request from the bus master circuit. Thus, in order to avoid deadlock situations arising, such bus slave circuits may be provided with the capability of issuing such a retract signal combination to cause the bus master to abort the burst mode transfer as if it had never occurred and retry it at a later time in dependence upon higher level logic within the bus master circuit.

A listing of various bus signals used follows:

| Signal | Source | Description |
|---|---|---|
| B_CLK | BUS CTRL | Bus Clock<br>The FALLING edge is the active edge for transactions |
| B_REQ | MASTER -> SLAVE | Bus Request<br>Fully pipelined 'next cycle' sequential access<br>0 Next transaction,is not a data transfer<br>1 Next transaction is a data transfer<br>In multiplexed variant 0 indicates Address cycle |
| B_D[31:0] | MASTER (write<br>SLAVE (read | Bus data channel<br>32-bit bidirectional data bus<br>In multiplexed implementation the burst address information is broadcast on this bus at the start of the packet transfer addition to data<br>The slave drives data onto this bus for READ transactions<br>The slave reads data from bus for WRITE transactions |
| B_WAIT | SLAVE -> MASTER | Bus Wait<br>Transaction completion hold-off for slow access |

-continued

| Signal | Source | Description |
|---|---|---|
|  |  | Slave devices which cannot complete in one cycle<br>or an external bus interface operation insert wait states until ready to complete<br>0 complete data transfer this cycle<br>1 insert wait state this cycle |
| B_AREQ | SLAVE -> MASTER | Bus Address Request<br>Slave requests new address next cycle this is pipelined from the addressed slave (e.g. last address of a page being accessed) which the master must respond to by broadcasting an address cycle next cycle<br>B_AREQ should only be asserted for the same cycle as B_wait is removed (completion cycle)<br>0 allow burst to continue<br>1 force address broadcast next cycle |

Figure 3:
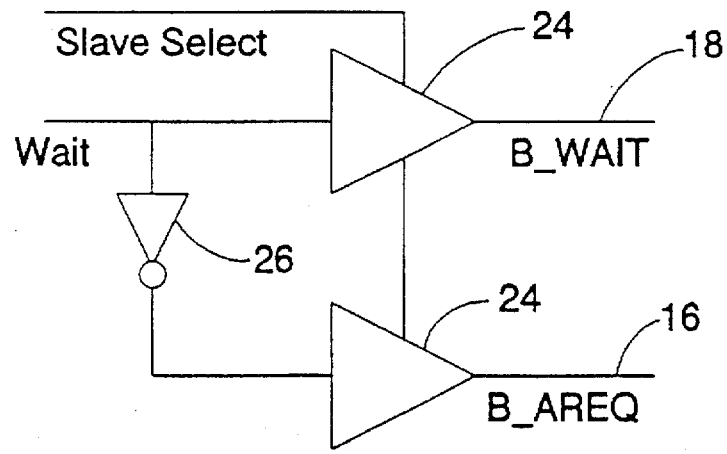
FIGS. 3, 4 and 5 illustrate circuit portions within differing types of bus slaves for generating bus signals.

FIG. 3 illustrates a circuit portion within a simple bus slave circuit having no burst mode capability. A signal "Slave Select" internal to the bus slave is high when that bus slave is being addressed by the bus master on the bus 4. The "Slave Select" signal switches on a pair of tri-state buffers 24 (high impedance when disabled) that drive the address request signal line 16 and the wait cycle request signal line 18 respectively. Another signal "Wait" internal to the bus slave indicates whether a wait cycle is required for the next cycle. An inverter serves to ensure that the B_WAIT and B_AREQ signals are not asserted together by this circuit portion and to also generate an address request signal for the next cycle each time the bus slave accepts a data word by removing the wait request. In this way an address request follows receipt of each data word in a manner appropriate to a bus slave having no burst mode capability.

Figure 4:
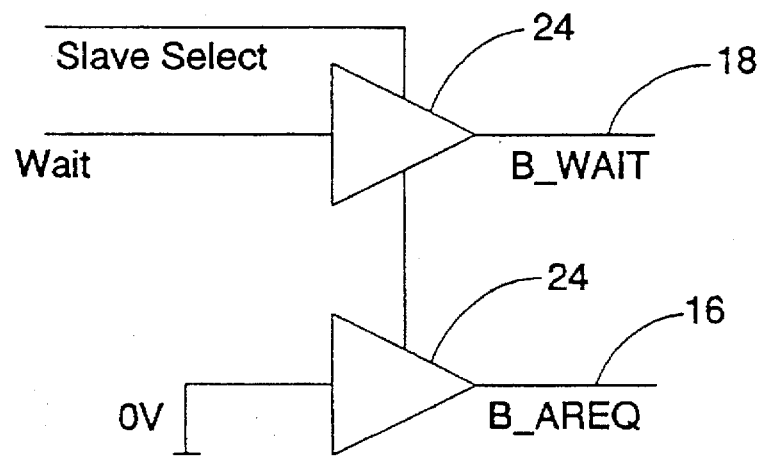

FIG. 4 illustrates the corresponding circuit portion for a bus slave having a full burst mode capability. In this case, the buffer 24 driving the address request signal line 16 has 0V permanently applied to its input so that an address request signal is never generated by this circuit portion.

Figure 5:
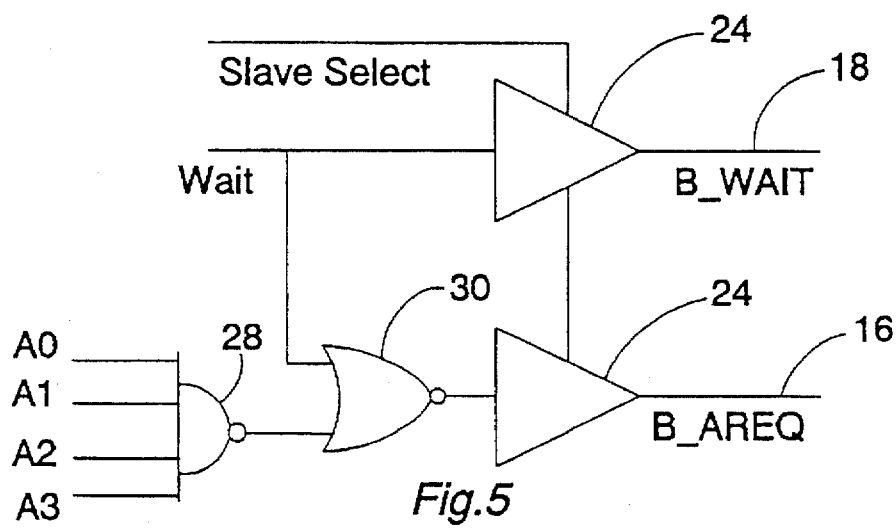

FIG. 5 illustrates a bus slave with a partial burst mode capability in that it requires an address word at page boundaries that occur every sixteen data words. The least significant four bits of the address A0, A1, A2 and A3 are input to a four input NAND gate 28. These lowest four address bits are all 1s once every sixteen addresses as the address value is incremented. These four 1s occur in the address preceding the crossing of a sixteen word page boundary. Accordingly, the occurrence of all four 1s indicates that an address word will be required in the next cycle before any more data words can be accepted. The output of the NAND gate 28 goes to 0 when all four 1s occur.

The output of the NAND gate 28 together with the internal "Wait" signal are input to a NOR gate 30. When the "Wait" signal is low indicating that the slave is able to accept signals on the Address/Data signal lines 14 on the next cycle and the output of the NAND gate 28 is 0, then the output of the NOR gate will switch to a 1. This output of the NOR gate 30 passes through the buffer 24 to drive the address word in the next processing cycle.

The next address in the sequence will have all 0s for the lowest four bits and so the output of the NAND gate 28 will go to a 1 and the B_AREQ signal will be a 0.

It will be seen that the bus slave indicates to the bus slave whether it requires an address word for the next cycle (B_AREQ) and indeed whether it is ready to accept signals at all (B_WAIT). If the bus master has finished its transfer with this slave, then the "Slave Select" will be deasserted and the output of the buffers 24 will be disabled.

The form of the bus signals described above yields a symmetry in the relationship between the bus master and the bus slaves. Rather than requiring the bus master to have the capability to predict the needs of each bus slave on each processing cycle, the bus slaves themselves are able to indicate to the bus master their need for address words or data words and wait cycles to match processing speeds; this is a considerable benefit.

I claim:

1. An apparatus for data processing, said apparatus comprising:

a data bus (4) for carrying data words and address words;

a bus master circuit (6) for initiating a burst mode transfer via said data bus in which said bus master generates an address word, said address word specifying a start address of a sequence of addresses, relating to respective ones of a plurality of data words to be transferred via said data bus in successive processing cycles; and a bus slave circuit (8, 10, 12) for receiving said plurality of data words of said burst mode transfer from said bus master circuit via said data bus; characterised in that;

said data bus includes an address request signal line (16);

said bus slave circuit includes means for generating an address request signal when an address word is required by said bus slave circuit in a next processing cycle; and said bus master circuit includes means responsive to an address request signal received from said bus slave circuit via said address request signal line for interrupting said burst mode transfer and generating the required address word in said next processing cycle.

2. An apparatus as claimed in claim 1, wherein:

said data bus includes a wait cycle request signal line (18);

said bus slave circuit includes means for generating a wait cycle request signal when a wait cycle is required by said bus slave circuit in said next processing cycle; and said bus master circuit includes means responsive to a wait cycle request signal received from said bus slave circuit via said wait cycle request signal line for inserting a wait cycle in said next processing cycle.

3. An apparatus as claimed in claim 2, wherein said bus master includes means responsive to simultaneous receipt of an address request signal and a wait cycle request signal for aborting and later retrying said burst mode transfer.

4. An apparatus as claimed in any one of claims 1, 2 and 3, wherein:

said data bus includes an address or data specifying signal line (14);

said bus master circuit includes means for generating an address or data specifying signal specifying whether an address word or a data word will be generated by said bus master circuit during said next processing cycle as part of said burst mode transfer; and said bus slave circuit includes means responsive to an address or data specifying signal received from said bus master circuit via said address and data specifying signal line for controlling processing by said bus slave circuit during said next processing cycle.

5. An apparatus as claimed in any one of the preceding claims, wherein said bus master circuit and said bus slave circuit are formed on a single integrated circuit (22).

6. An apparatus as claimed in any one of the preceding claims, wherein said bus master comprises a central processing unit core (6).

7. An apparatus as claimed in any one of the preceding claims, wherein one or more of said bus slave circuits comprises a page mode random access memory (12).

8. An apparatus as claimed in any one of the preceding claims, wherein one or more of said bus slave circuits comprises a cache memory (8).

9. A method of data processing, said method comprising the steps of:

initiating, in a bus master circuit, a burst mode transfer via a data bus for carrying data words and address words in which said bus master circuit generates an address word, said address word specifying a start address of a sequence of addresses, relating to respective ones of a plurality of data words to be transferred via said data bus in successive processing cycles; and receiving, in a bus slave circuit, said plurality of data words of said burst mode transfer from said bus master circuit via said data bus; characterised in that:

when an address word is required by said bus slave circuit in a next processing cycle, said bus slave circuit generates an address request signal on an address request signal line of said data bus; and in response to said address request signal received from said bus slave circuit via said address request signal line, said bus master circuit interrupts said burst mode transfer and generates the required address word in said next processing cycle.

* * * * *